United States Patent [19]

Maguire et al.

[11] Patent Number: 5,034,061

[45] Date of Patent: Jul. 23, 1991

[54] TRANSPARENT SHATTER-RESISTANT SILICONE COATING

[75] Inventors: Thomas F. Maguire, Troy; George F. Medford, Ballston Lake, both of N.Y.

[73] Assignee: General Electric Company, Waterford, N.Y.

[21] Appl. No.: 494,646

[22] Filed: Mar. 15, 1990

[51] Int. Cl.$^5$ .............................................. C08G 77/42
[52] U.S. Cl. .............................. 106/287.14; 525/477; 525/478
[58] Field of Search .............................. 525/477, 478; 106/287.14

[56] References Cited

U.S. PATENT DOCUMENTS

| | | | |
|---|---|---|---|
| 4,163,082 | 7/1979 | Romenesko | 428/447 |
| 4,461,854 | 7/1984 | Smith | 523/211 |
| 4,489,127 | 12/1984 | Gutek et al. | 428/266 |
| 4,529,752 | 7/1985 | Bluestein | 523/214 |
| 4,599,374 | 7/1986 | Bluestein | 523/213 |

*Primary Examiner*—William R. Dixon, Jr.
*Assistant Examiner*—Alan A. Wright
*Attorney, Agent, or Firm*—Mary A. Montebello

[57] ABSTRACT

A transparent and fast curing composition suitable for use as a shatter-resistant coating on a glass, porcelain, or ceramic surface, wherein the composition comprises:

(A). at least about 62 to about 71 parts by weight of a solid, benzene soluble resin copolymer consisting essentially of $R_3SiO_{1/2}$ units and $SiO_{4/2}$ units, (B). from about 29 to about 38 parts by weight of an essentially cyclic free, polydiorganosiloxane, the viscosity of the polydiorganosiloxane having a value of from about 500 to about 1,000,000 centipoises at 25° C., the total of (A) and (B) being 100 parts by weight;

(C). an organopolysiloxane having silicon bonded hydrogen atoms, (D). a platinum containing catalyst in sufficient quantity to provide at least 0.1 part by weight of platinum for every one million parts by weight of the combined weight of (a), (b), and (c).

The composition forms a coating which is transparent, fast curing, and stable at elevated temperatures. In preferred embodiments, component A is present at about 66 to about 71 parts by weight, which results in the cured composition being substantially tack-free, as well as transparent, fast curing and stable at elevated temperatures.

13 Claims, No Drawings

TRANSPARENT SHATTER-RESISTANT SILICONE COATING

BACKGROUND OF THE INVENTION

This invention relates to silicone elastomeric coatings. More particularly, this invention relates to transparent shatter-resistant silicone elastomeric coatings useful for retaining fragments during breakage of glass, porcelain, and ceramic materials.

Breakage of glass, porcelain, and ceramic materials into fragments presents problems in the form of sharp projectiles, spilled contents and hazardous remains. Present means to counter this package deficiency include organic coatings on glass or ceramic surfaces, metal containers, and wire cages.

Organic coatings, however, have low temperature limitations relative to the capabilities of glass or ceramic materials. As a result, such coatings tend to thermally degrade at temperatures greater than 350°–400° F.

Metal containers are generally undesirable because they are not transparent or translucent and would not permit viewing of the breakable object and further, as a container for a light bulb, would not permit the transmission of light.

A wire cage permits viewing of the breakable object and lets light emissions out, but has considerably less containment potential than a continuous film. In addition, the aesthetics of a wire cage are less than desirable.

The use of silicone coatings to resist shattering is also known in the art. For example, U.S. Pat. No. 3,715,232 to Audesse et al. (Audesse), discloses an incandescent lamp having 2 silicone layers. The first layer, which is disposed on the surface of the lamp, is a shatter-resistant clear silicone rubber. It is disclosed in Audesse that this layer is satisfactory in reducing or eliminating scattering of the pieces on breakage but because of the layer's soft, tacky nature, dust collects on it and adheres so firmly that the dust could not be removed. Thus, a second layer is used on the surface of the first layer and provides a hard, nontacky surface to which dust will not readily adhere and from which dust can easily be removed. At column 2, lines 57–60, it is pointed out that the cure time is 30 minutes at a temperature of 175°–185° C.

Thus, Audesse teaches the use of two protective layers to provide an incandescent lamp with shatter resistance and a nontacky surface. It is desirable, however, to provide a single silicone elastomeric coating which is both shatter resistant and substantially tack-free. It is further desirable to provide a shatter-resistant coating which is faster curing.

U.S. Pat. No. 3,621,323 to Thomas et al. (Thomas), discloses the use of a single shatter-resistant silicone elastomeric coating on an incandescent lamp. The coating contains an organopolysiloxane in a hydrocarbon solvent. The particular organopolysiloxane is a methylpolysiloxane containing terminal silicon-bonded hydroxy groups which is cured with a metallic salt selected from dibutyl tin dilaurate and dibutyl tin diacetate. The coating can withstand temperatures approaching 600° F. for over 1,000 hours without loss of strength or elasticity. The coating adheres firmly to the glass envelope of the lamp and is substantially translucent throughout its usable life.

Thus, Thomas teaches a silicone elastomeric coating which is heat stable and substantially translucent. It would be desirable, however, to provide a shatter resistant silicone elastomeric coating which is transparent rather than translucent so as to maximize the amount of light which passes through the coating from the lamp filament.

U.S. Pat. No. 3,529,035 to Lamoreaux discloses a silicone elastomeric composition useful as a shatter-resistant coating for light bulbs, wherein the composition comprises $R^1_2$ units, $SiO_2$ units, and $-O-[-SiOR_2-]_n-$ units, with n having a value of at least 1,000. The coating is transparent and tough, and has a cure time of 1–4 hours at 50°–150° C.

Although the shatter-resistant coating taught in Lamoreaux is transparent, it would be desirable to provide a transparent shatter-resistant coating which is also faster curing.

In U.S. Pat. No. 4,860,906 to Pelligrini et al. (Pelligrini), a glass container is provided with an elastomeric silicone coating having improved resistance to shock, breakage, and fragmentation and having substantial heat stability. The coating is preferably a silicone rubber made by compounding silicone elastomers with fillers and vulcanizing agents. The coating is also transparent and resists discoloring at elevated temperatures. Furthermore, the coating provides a rubber-like, non-slip surface. Pelligrini does not disclose the cure time of the coating.

Although Pelligrini teaches that silicone elastomeric coatings in general can be used as shatter-resistant coatings for glassware, it has been found that not all silicone elastomeric coatings are shatter-resistant. It has further been found that transparency and cure times vary with the silicone elastomer composition. Thus, it is continually desired to provide a shatter-resistant silicone elastomer coating which is transparent and fast curing.

The present invention is based on the discovery that a silicone elastomeric composition containing critical amounts of a resinous copolymer comprising $R_3SiO_{\frac{1}{2}}$ units and $SiO_{4/2}$ units (MQ resin) in combination with a vinyl-containing polydiorganosiloxane, a organohydrogenpolysiloxane, and a platinum-containing catalyst, will provide a single shatter-resistant coating for glass, ceramic, or porcelain articles, which is transparent, fast curing, and stable at elevated temperatures.

The combination of ingredients used in the present invention is known in the art. For example, the combination is disclosed in U.S. Pat. No. 4,528,314, to Modic, as a dirt resistant silicone coating for use on silicon-coated membrane structures. The coating is transparent in the absence of fillers.

U.S. Pat. Nos. 4,774,297 and 3,983,298, to Murakami et al. and Hahn et al., respectively, and copending, commonly-assigned application Ser. No. 339,041, filed Apr. 17, 1989, disclose pressure sensitive adhesives containing the ingredients present in the composition of the present invention.

Although the above references disclose the combination of ingredients used in the present invention, the references do not teach the combination of the ingredients containing the resinous copolymer in the amounts critical to the curing of the composition of this invention to form shatter resistant coatings which are transparent and fast curing.

SUMMARY OF THE INVENTION

The present invention provides a transparent and fast curing shatter-resistant coating suitable for use on glass, ceramic, and porcelain articles, comprising:

(A). at least about 62 to about 71 parts by weight of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ units, at least 95 percent of all R radicals in (A) being methyl and the total number of R radicals in (a) that have olefinic unsaturation being 0–0.5 percent of all R radicals in (A), (B). from about 29 to about 38 parts by weight of an essentially cyclic free, polydiorganosiloxane of the average formula $$R^1{}_2R^2SiO(R^1{}_2SiO)_m(R^1R^2SiO)_nSiR^2R^1{}_2$$

where each $R^1$ individually is a radical selected from the group consisting of methyl, ethyl, propyl, and phenyl, at least 95 percent of all $R^1$ radicals being methyl, each $R^2$ individually is a vinyl radical or any $R^1$ as defined above with the proviso that at least 2 $R^2$ radicals must be vinyl and m+n has an average value such, that the viscosity of the polydiorganosiloxane (B) has a value of from about 500 to about 1,000,000 centipoises at 25° C., the total of (A) and (B) being 100 parts by weight;

(C). an amount of an organopolysiloxane compatible with the mixture of (A) and (B) and having an average unit formula $$R^3{}_aH_bSiO_{(4-a-b)/2}$$

where each $R^3$ individually is any $R^1$ radical as defined above, a has a value of from 1.00 to less than 2.00, b has a value of from 0.05 to 1.00, the sum of a plus b being from 1.10 to less than 3.00, there being an average of greater than 2.0 silicon bonded hydrogen atoms per molecule of (C), no silicon atom bearing more than one silicon bonded hydrogen atom and the amount of (C) present being sufficient to provide from 1.0 to 30.0 silicon bonded hydrogen atoms for every olefinically unsaturated radical in the total of (A) plus (B) and, (D). a platinum containing catalyst in sufficient quantity to provide at least 0.1 part by weight of platinum for every one million parts by weight of the combined weight of A, B, and C.

The present invention is also directed to glass, ceramic, and porcelain articles having disposed on the surface thereof a coating containing the composition described above. In particular, the present invention is further directed to incandescent electric lamps having disposed thereon the coating of the composition of this invention.

The silicone elastomeric composition of the present invention has good adhesion to the glass or ceramic surface on which it is applied and is transparent to visible light as well as to most infrared and ultraviolet spectral wavelengths. The coating provides 100% retention of shards upon breakage of the object on which it is coated and retains its capacity to retain fragments during breakage even after extended exposure at elevated temperatures above those where most organic coatings function. The coating is fast curing, i.e., about 2 to about 6 minutes at 160°–170° C., and at narrower ranges of MQ concentration, i.e., about 66 to about 71 parts by weight, the cured coating is substantially tack-free, i.e., less than about 100 g/cm².

DETAILED DESCRIPTION OF THE INVENTION

Component A is a solid, resinous polyorganosiloxane composed of $R_3SiO_{\frac{1}{2}}$ units (M units) and $SiO_{4/2}$ units (Q units). The R groups in the M units may be identical or different and are monovalent hydrocarbon radicals containing no more than six carbon atoms such as alkyl radicals such as methyl, ethyl, and isopropyl; cycloaliphatic radicals such as cyclopentyl and cyclohexenyl; olefinic radicals, such as vinyl and allyl; and the phenyl radical. Typical M units are

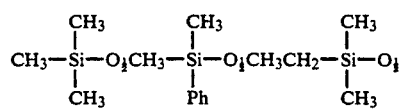

where Ph is, above and hereinafter, the phenyl radical. It is preferred that at least 95 percent of all the R radicals in the copolymer of component A are methyl and that essentially all of the radicals are free of olefinic unsaturation. Up to 0.5 percent of all R radicals in the copolymer can be olefinically unsaturated, such as vinyl. More preferably the number of unsaturated R radicals can range from 0 to 0.2 percent of all R radicals in the copolymer.

The Q units in the copolymer of component A are essentially all siloxane units, containing no silicon bonded carbon atoms and are derived directly from the silica hydrosol in the preferred method of Daudt and Tyler. It should be understood that the resin copolymers that are operable in this invention often have as much as 3 to 4 percent by weight, based on the total weight of the copolymer, of hydroxyl radicals bonded directly to the silicon atom of the Q units, the actual amount of said hydroxyl radicals being dependent upon the method of preparation of the resin copolymer.

Resin copolymers that are operable in the invention are soluble in aromatic solvents such as benzene, toluene, xylene and the like and have a ratio of M units to Q units whose value is from 0.6:1.0 to 0.9:1.0. The M/Q ratio in the copolymer can be determined by one or more standard analytical techniques such as elemental analysis, infra-red spectroscopy, nuclear magnetic resonance spectroscopy, etc. For example, in a resin copolymer having only trimethylsiloxane units and silica units, a knowledge of the percent by weight of carbon in the resin copolymer of component A is sufficient to establish its M/Q ratio.

Preferably, the resin copolymer of component A consists essentially of

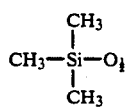

units and $SiO_{4/2}$ units in the stated ratio. It is to be understood that trace amounts of diorganosiloxane units and monoorganosiloxane units are within the scope of this invention as components in the resin copolymer of component A.

The resinous copolymer useful as Component A herein can be prepared by any of the known methods for preparing such resins. For example, cohydrolysis of an appropriate amount of each of the silanes of the formulae $$R_3SiX \text{ and } SiX_4$$

to give M units and Q units respectively in the desired M/Q ratio in the resin copolymer can be used when X is a hydrolyzable group such as alkoxy. Preferably, resin copolymer of component A is prepared by the method of Daudt and Tyler, U.S. Pat. No. 2,676,182, which is hereby incorporated by reference, to show the method of preparation and the compositions that are obtainable. Briefly, the method of Daudt and Tyler comprises reacting under acidic conditions, a silica hydrosol with organosubstituted siloxanes, for example, hexamethyldisiloxane, or hydrolyzable organosubstituted silanes, for example, trimethylchlorosilane, or their mixtures and recovering a resin copolymer having M and Q units which is soluble in aromatic solvents.

Regardless of the method of preparation, the weight of the resin copolymer and the ratio of M units to Q units in the resin copolymer that is used in this invention is based on the non-volatile portion of the resin copolymer. To determine the non-volatile portion of the resin copolymer a known weight of resin copolymer, as prepared, preferably dissolved in a volatile solvent such as toluene or xylene, is heated at 150° C. for 45 minutes to yield a non-volatile residue. The amount of the non-volatile portion of the resin copolymer is often based on the weight of the organic solvent solution of the resin copolymer and is expressed as "percent solids".

It is critical to the present invention that component A be present in the composition of this invention in an amount in the range of about 62 to about 71 parts by weight based on the total weight of components A and B. If the amount of component A is less than about 62 parts by weight, the coating is so tacky that it cannot provide 100% retention of the shards upon breakage of the article. If the amount of component A is greater than about 71 parts by weight, the coating is too brittle and loses its shatter retainment characteristics.

In preferred embodiments of this invention, the coating is not only shatter resistant but also substantially tack-free. To achieve both of these properties, component A must be present in the composition of this invention at about 66 to about 71 parts by weight, and preferably about 69.5 to about 71 parts by weight, based on 100 parts of components A and B.

Component B is a vinyl-functional polydiorganosiloxane and may be any of the linear polysiloxanes of the average formula

where $R^1$ and $R^2$ have the meaning given above, with the provision that at least 2 $R^2$ radicals are vinyl and where the sum $m+n$ has a value such that the polysiloxane has a viscosity of 500 to 1,000,000 centipoise at 25° C.

Particularly preferred as polydiorganosiloxanes of component B are the well known vinyl endblocked siloxanes of the average formula

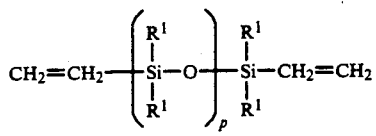

where $R^1$ is as above, and p has a value such that the polysiloxane has a viscosity of 500 to 1,000,000 centipoise at 25° C.

Polydiorganosiloxanes of component B can be prepared by any of the conventional methods for preparing triorganosiloxane terminated polydiorganosiloxanes. For example, a proper ratio of the appropriate hydrolyzable silanes, e.g. vinyldimethylchlorosilane and dimethyldichlorosilane, may be cohydrolyzed and condensed or alternately an appropriate 1,3-divinyldimethyldiphenyldisiloxane, which furnishes the endgroups of the polydiorgansiloxane, may be equilibrated with an appropriate diorganopolysiloxane e.g. octamethylcyclotetrasiloxane, in the presence of an acidic or basic catalyst. Regardless of the method of preparation of the polydiorganosiloxane, there is usually coproduced a varying quantity of volatile, cyclic polydiorganosiloxanes. The amount used of polydiorganosiloxane, its average formula, and its viscosity, for the purposes of this invention, refers to the essentially cyclic free portion of the polydiorganosiloxane. This essentially cyclic free portion can be prepared by stripping the polydiorganosiloxane at 150° C. for 3 hours to yield a residue. This residue will be essentially free of cyclic material with the exception of trace quantities of macrocyclic polydiorganosiloxanes which are non-volatile at 150° C. and atmospheric pressure. Many of these polydiorganosiloxanes are commercially available. Furthermore, component B can be homopolymers or copolymers of the stated average formula.

The terminal units of the preferred form of component B are triorganosiloxane units in which one of the organic groups is a vinyl group that is bonded directly to the silicon atom of the terminal unit. The two $R^2$ radicals in each terminal unit of (b) are any of the $R^1$ radicals defined above, but are preferably selected from the group consisting of methyl and phenyl. Preferred terminal units for component B are vinyldimethylsiloxy units.

The polymer chain of the preferred form of polydiorganosiloxane of component B, exclusive of terminal units, is made up of diorganosiloxane units containing $R^1$ radicals which can all be identical or a mixture of $R^1$ radicals. Trace amounts of $R^1{}_3SiO_{\frac{1}{2}}$ units, $R^1SiO_{3/2}$ units and $SiO_{4/2}$ units are permissible in component B. $R^1$ is selected from the group consisting of methyl, ethyl, propyl, and phenyl, with at least 95 percent, and preferably 100 percent of all $R^1$ in the polydiorganosiloxane of component B being the methyl radical.

The value of n is such that the viscosity of component B is between 500 and 1,000,000 centipoises when measured at 25° C. Depending on the type of $R^1$ radicals in component B the permissible average value of n will vary.

Component C is an organopolysiloxane of the average unit formula

having silicon bonded hydrogen atoms that are reactive with silicon bonded vinyl radicals in the presence of a platinum catalyst. $R^3$ can be any $R^1$ radical as defined above, but preferably $R^3$ is methyl or phenyl. In order to be effective for this invention, component C must be compatible with, and preferably soluble in, the mixture of A and B. By "compatible", it is meant that the required amount of organopolysiloxane C is at least partially soluble in the mixture of A and B and will exist in a uniformly dispersed state in the compositions of this invention while participating in the curing reaction, until the cure has been effected.

In the formula above for component C, a has a value of from 1.00 to less than 2.00, b has a value of from 0.05 to 1.00 and sum of a+b has a value of from 1.10 to less that 3.00. Furthermore, component C must have an average of greater than 2, for example 2.1, 2.5, 3.5, 10, or more, and preferably, at least 3 silicon bonded hydrogen atoms per molecule, no silicon atom bearing more than one silicon bonded hydrogen atom.

Component C is present in an amount that is sufficient to provide from 1.0 to 30.0, and preferably about 4.0 to about 10, silicon bonded hydrogen atoms for every olefinically unsaturated radical in the total of components A plus B. The number of olefinically unsaturated radicals in A and B and the number of silicon bonded hydrogen atoms in any given quantity of C can be determined by analytical techniques that are standard to the organosilicon art.

Illustrative of component C which are operative in the present invention are fluid polyorganosiloxanes such as $Me_3SiO(Me_2SiO)_3(MeHSiO)_5SiMe_3$ $Me_3SiO(MeHSiO)_{10}SiMe_3$ $(MeHSiO)_{3,4,5}$ and their several mixtures, including their mixtures with other organopolysiloxanes having less than three silicon bonded hydrogen atoms per molecule; fluid siloxane copolymer resins comprising of $SiO_{4/2}$ units, $Me_3SiO_{\frac{1}{2}}$ units and units such as $Me_2HSiO_{\frac{1}{2}}$, $MeHSiO_{2/2}$, and $Me_2SiO_{2/2}$, etc.; and the mixtures of fluid polyorganosiloxanes and fluid siloxane copolymer resins described in U.S. Pat. No. 3,627,851. These latter compositions (known as $M^HQ$ resins) comprise dimethyl hydrogen siloxy units ($M^H$ units) trimethylsiloxy units (M units) and $SiO_2$ units (Q units) where the ratio of dimethylhydrogensiloxy units ($M^H$) units to Q units is 0.4:1.0 to 1.2:1.0 inclusive, the ratio of M units to Q units is from 1.5:1.0 to 2.2:1.0 and the ratio of $M^H$ and M units to Q units is from 2.4:1.0 to 3.0:1.0. Organopolysiloxanes C that have at least one $R^3$ group, preferably a methyl group, bonded to the silicon atoms that bear the reactive hydrogen atoms are preferred. It is to be understood that component C can be a single compound or a mixture of compounds as long as the average unit formula is as indicated and the indicated compatibility is realized.

Component D is any platinum catalyst known to be effective for catalyzing the reaction of silicon bonded hydrogen atoms with silicon bonded vinyl groups. Examples of suitable catalysts include finely divided metallic platinum, platinum on a finely divided carrier such as alumina, compounds of platinum such as chloroplatinic acid, and complexes of platinum compounds.

Suitable platinum catalysts include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the above U.S. patents are incorporated by reference into the present disclosure. Catalysts that are soluble in the mixture of A plus B plus C are preferred, especially where optical clarity is desired.

The platinum catalyst is present in an amount sufficient to provide at least 0.1 part by weight platinum for one million parts by weight of the combined weight of A, B, and C. Frequently, such small amounts of catalysts are poisoned by trace quantities of impurities in the composition so it is advantageous to employ the platinum catalyst in such quantities to provide at least 1.0 ppm platinum.

The components of the compositions of this invention can be mixed in bulk or in organic solvent. Since the resin copolymer A is a solid and is conveniently prepared and handled in an organic solvent, the preparation of the compositions of this invention preferably uses an organic solvent, at least for the mixing of A and B. The organic solvent can be any of the solvents conventionally used with organosiloxanes and having a boiling point below approximately 250° C., such as aromatic hydrocarbons such as benzene, toluene, and xylene; aliphatic hydrocarbons such as hexane, heptane, and cyclohexane; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers such as tetrahydrofuran and dimethylether of ethylene glycol, ketones such as methyl isobutyl ketone and esters such as ethyl acetate and the like. Mixtures of the organic solvents can also be used. Mixing of the components can be accomplished by any of the techniques that are known in the polymer art such as milling, blending, stirring, and the like, either in batch or in continuous process.

The compositions of this invention are obtained whenever the components A, B, C, and D are mixed together in the stated proportions. The order of mixing of the components is critical, in that components A and B should always be mixed thoroughly before components C and D are added. Components C and D should not be added to components A and B until the composition is ready for use because the presence of C and D causes the mixture of A, B, C, and D to gel prematurely.

The best method of preparing the compositions of this invention is to mix the resin copolymer which may be dissolved in about an equal weight of an organic solvent to facilitate mixing, with the polydiorganosiloxane. In this method, a sufficient quantity of polydiorganosiloxane, whose essentially cyclic free content has been determined, is used to contain the desired weight of essentially cyclic free polydiorganosiloxane B. Of course, the non-volatile resin copolymer A and/or the essentially cyclic free polydiorganosiloxane B can be prepared separately and then mixed, with or without the aid of solvent. To obtain compositions having at least 70% and preferably about 90% solids the resin copolymer and the polydiorganosiloxane should be devolatilized under conditions equivalent to heating for 3 hours at 150° C. at atmospheric pressure in order to obtain optimum shatter containment properties. Obviously, excessively high temperatures should be avoided when components A and B or their mixtures are being devolatilized. A temperature of 200° C., and preferably 150° C., should not be exceeded.

The mixture of A, B, and solvent is conveniently devolatilized in thin film at 150° C. at a pressure of about 8 mm of mercury. Additional solvent may be added to the cooled, devolatilized mixture of A and B to obtain a desired viscosity. Organopolysiloxane C and catalyst D are added to the devolatilized mixture of A and B to complete the composition and curing of the composition will begin, unless a platinum catalyst inhibitor described below has been added. The platinum catalyst inhibitor, if added, is best added to the cooled, devolatilized mixture of A and B.

Small amounts of additional ingredients may be added to the compositions of this invention if desired. For example, antioxidants, pigments, stabilizers, fillers, and the like, may be added as long as they do not materially reduce the shatter containment or transparency properties of these compositions. Volatile additives are preferably added after any solvent removal operations have been completed.

The compositions of this invention can be cured at room temperature or cured by heating. When curing by heat, a temperature in the range of about 70° to about 200° C., and preferably about 160° C. to about 170° C., is used. The cure time at a temperature in the range of about 160° C. to about 170° C. is about 2 to about 6 minutes.

Preferably the uncured compositions of this invention should be used within a few hours after being prepared, although this time interval from preparation to use, otherwise known as "shelf life", can extend to several days by maintaining the mixture at room temperature, or can be extended even longer by cooling the mixture to a temperature of −20° C. or below. Equally long or longer "shelf life" can be realized by mixing a platinum catalyst inhibitor with the curable mixture.

Platinum catalyst inhibitors which are useful in the compositions of this invention and which display varying lengths of cure time inhibition in the compositions of the invention are those described in U.S. Pat. Nos. 3,188,299, 3,188,300, 3,192,181, 3,344,111, 3,383,356, 3,445,420, 3,453,233, 3,453,234, 3,532,649, 4,340,710, all of which are incorporated by reference herein.

The effectiveness of a platinum catalyst inhibitor depends on many factors such as its chemical composition, its physical properties, its concentration, etc. For the purposes of this invention an effective amount of any particular platinum catalyst inhibitor can be determined by routine experimentation. Since many platinum catalyst inhibitors are relatively volatile it is preferable to add them to the compositions of this invention after any heating and/or vacuum operations of the preparative process have been completed. For maximum effectiveness, however, a platinum catalyst inhibitor should be added to the compositions of this invention at least simultaneously with, and preferably prior to the mixing of components C and D.

The compositions of this invention, when containing a platinum catalyst inhibitor, can be cured by removing the inhibitor, for example, by evaporation at room temperature or higher. Curing can also be accomplished in most cases by heating the compositions to a temperature of from 70° to 120° C., preferably from 100° to 150° C.

A preferred form of this invention is a mixture of A, B, C, and D, curable with heat, and having a platinum catalyst inhibitor in an amount effective to inhibit the catalytic action of the platinum containing catalyst below a temperature of approximately 70° C.

The uncured compositions of this invention can be used as a solution in one or more of the organic solvents described above or said compositions can be used with no solvent present. Those skilled in the art will vary solvent content according to the viscosity of the polymer and the desired coating viscosity. While it is possible to use as much as 50 percent and more of an organic solvent, it is usually sufficient and preferred to employ no more than 10 percent, and frequently as little as about 5 percent by weight, based on the total weight of the composition, of one or more of the organic solvents described above to aid in the application of said compositions. This can be accomplished most easily merely by not removing all of the solvent that is used in the preparation of said compositions. Alternately, all of the solvent that is used in the preparation of the compositions of this invention can be removed and the desired amount of the same or another solvent can be added subsequently. It will be obvious to those skilled in the art that in the case where the solvent that is used to aid in the application of the compositions of this invention has a higher boiling point than the solvent used in their preparation, the necessary solvent change can be accomplished in two steps as described above or in a one step process wherein the higher boiling point solvent is present in the mixture during the removal of the lower boiling solvent. If, during the preparation of the compositions of this invention, any portion of the solvent is removed, particularly if heat and/or vacuum is used to remove said solvent, it is preferred to remove said solvent prior to the addition of other volatile components or component C. Said removal of solvent can be accomplished by any of the known techniques such as entertainment in a stream of inert gas, evaporation, distillation, thin film stripping, etc., and at any combination of temperature and pressure where the temperature is not allowed to exceed approximately 200° C., preferably about 150° C.

The compositions of this invention are useful as shatter containment coatings for glass, porcelain, and ceramic substrates. The coatings will readily stick to a glass, porcelain or ceramic surface and may be applied to such surface by any suitable means such as rolling, spreading, dip coating, spraying, and the like.

The composition of this invention provides excellent results as a shatter-resistant coating for an incandescent electric lamp. Although the invention will be described with reference to incandescent electric lamps, it should be understood by those skilled in the art that the invention also has application wherever safety coated glass, ceramic, or porcelain articles are desired, including laboratory environments and the household.

Since incandescent lamps become hot when lighted, with surface temperatures of the glass envelope often exceeding 500° F. and because of other required properties of high elasticity, toughness, minimum light transmission impairment, and good bonding, the composition of the present invention provides excellent results as a coating when applied to the outer surface of the lamp.

The lamp is coated with the composition of this invention by spraying or flowing the composition onto the lamp or by dipping the lamp into the composition. Before applying the coating, the lamp must be cleaned so that no foreign matter adheres to its surface. One method of cleaning the lamp is to wipe it first with toluene and then with isopropyl alcohol to remove any atmospheric moisture which may have adhered to the surface of the lamp. However, any method of cleaning is acceptable as long as no residue or film is left on the surface of the lamp.

The preferred method for applying a coating of the present invention onto the surface of an incandescent light bulb is the dip coating process, wherein the entire glass envelope and a slight portion of the metal socket are immersed into a coating bath and then withdrawn and allowed to drain for about 10 minutes. The coated light bulb is then dried at 95° C. for about 2 to 5 minutes and passed through a curing oven for about 2–4 minutes at 160° C. to 170° C.

It is found that a coating having a thickness of about 0.001 to about 0.010 inches with an average thickness of 0.003 inches is necessary to provide shatter-resistant characteristics.

In order that those skilled in the art might be better able to practice the present invention, the following examples are given by way of illustration and not by way of limitation.

EXPERIMENTAL

The following examples illustrate the effectiveness of the method and composition of the present invention in restraining fragments during the breakage of glass and ceramic materials.

In the following examples, shatter containment was measured by dropping or throwing a light bulb at a distance set forth in the examples onto a concrete or marble surface. The bulb was dropped with its metal threaded end pointing up and the bulb was positioned so that its glass surface struck the concrete surface first.

The following materials were used in the examples below, except as otherwise noted.

"MQ Resin" is a 60% by weight toluene solution of a resin prepared by condensing trimethylsilyl chloride with an aqueous silica sol substantially as taught in U.S. Pat. No. 2,676,182, which is incorporated herein by reference.

"MDHDM Fluid" is a fluid containing 0.25 mole percent hydrogen, prepared by condensing dimethylsilyl chloride with an aqueous silica sol substantially as taught in U.S. Pat. No. 3,627,851, which is incorporated herein by reference.

"MDVDM Fluid" is a substantially cyclic-free vinyl-dimethylsiloxy-endstopped polydimethylsiloxane containing approximately 0.0002 to 0.2 mole percent vinyl.

"Catalyst" is a platinum catalyst containing about 3.5 weight percent platinum prepared substantially as taught in U.S. Pat. No. 3,220,970, which is incorporated by reference herein.

CONTROL EXAMPLE A

An incandescent light bulb was left uncoated. The uncoated bulb of Control Example A was tested for shatter retention or containment by dropping the bulb at a distance of 18 inches onto a marble floor. The uncoated bulb shattered.

EXAMPLES 1–5

The compositions of Examples 1–5 were prepared by mixing MDVDM fluid, MQ resin (60% in toluene), and MDHDM fluid, and catalyzing the mixture with 1.0 microliters of catalyst per 10 g of total solids.

The MDVDM fluids in Examples 1–5 had viscosities of 3829 centipoise at 25° C. and a vinyl content of 0.006 mole per 100 g MDVM fluid. The MQ resins used in Examples 1, 2, 4 and 5 had a solids content of 62.0%. In Example 3, the MQ resin had a solids content of 60.8%. The MDHDM fluid used in Examples 1–5 had a hydride content of 0.2–0.3 mol per 100 g MDHDM fluid.

The amount of MQ resin present in the compositions of Examples 1–5 varied as shown in Table 1 below and are represented as % by weight based on the total weight of MQ resin and MDVDM fluid. The amounts of the MDHDM fluid are noted in Table 1.

The compositions prepared in Examples 1–5 above were coated at a thickness of approximately 3 mils onto an 100 watt incandescent light bulb having an average lifetime of 750 hours. The coating was oven flashed at 90° C. for 4 minutes, and then the coated bulb was removed to a 165° C. oven for a cure of 2 minutes. The coated bulb was then removed and cooled and the coating tested for retention (shatter-resistant) ability and tack. The results are shown in Table 1 below.

In Tables 1–3, the term "ok" for describing retention indicates that the particular coated bulbs passed the impact test in that while the glass envelope of the bulbs usually cracked, the coating did not shatter into pieces. The term "failed" means that the bulb shattered upon impact with the concrete surface. The measure of tack in the tables below was a qualitative estimation based on touching the coating with a finger. With regard to tack, the term "ok" means that the surface of the coating was dry to the touch while the term "slight" means that the surface was slightly tacky to the touch.

TABLE 1

| Example Number | g MQ Solids | g MDHM Fluid | MQ (%) | Retention | Tack |
|---|---|---|---|---|---|
| 1 | 7.3 | 0.64 | 67.4 | — | — |
| 2 | 12.4 | 0.57 | 67.4 | ok | slight |
| 3 | 13.4 | 0.54 | 69.0 | ok | slight |
| 4 | 13.8 | 0.62 | 69.6 | ok | ok |
| 5 | 16.8 | 0.61 | 73.6 | fail | ok |

EXAMPLES 6–10

An initial composition was prepared by mixing 75 g MDVDM fluid and 250 g MQ resin (60% in toluene), mixing in 6.1 g MDHDM fluid, and catalyzing the mixture with 1.0 microliters of catalyst per 10 g total solids. Aliquots of this formulation were then taken, and additional material was mixed in before coating as noted in Table 11. Example 8 was made separately by mixing 75 g of the MDVDM fluid with 274.6 g MQ resin (60% in toluene), mixing in 6.06 g MDHDM fluid, and catalyzing with 16.7 microliters of catalyst solution. The coatings were applied to bulbs by dip coat. The procedures followed in Examples 1–5 were repeated in Examples 6–10. The compositions used in Examples 6–10 were the same as those used in Examples 1–5 except that the MDVDM fluids had a viscosity of 86,000 centipoise at 25° C. and a vinyl content of 0.002 mole per 100 g MDVDM fluid. Furthermore, the MQ resin in Examples 6, 7, 9 and 10 had a solids content of 62.0% and the MQ resin in Example 8 had a solids content of 60.8%.

The data for Examples 6 10 are shown in Table 2.

TABLE 2

| Example Number | g initial Composition | g MQ Added | MQ (%) | Retention | Tack |
|---|---|---|---|---|---|
| 6 | 15.4 | —* | 62.9 | ok | tacky |
| 7 | 25.0 | — | 67.4 | ok | slight |
| 8 | — | — | 69.0 | ok | slight |
| 9 | 24.5 | 1.8 | 69.7 | ok | ok |
| 10 | 33.3 | 5.1 | 71.3 | ok | ok |

EXAMPLES 11–16

The procedures followed in Examples 6–10 were repeated in Examples 11–16. The compositions used in Examples 11–16 were the same as those used in Examples 6–10 except that the MDVDM fluids had a viscosity of 94,000 centipoise at 25° C. and a vinyl content of 0.002 mole %. Furthermore, the MQ resin in Examples 11–16 had a solids content of 66.2% and the MDHDM fluid had a hydride content of 0.2–0.3 mole %. The composition prepared in Example 15 further contained 10 g of MQ resin having a solids content of 64.6%.

The data for Examples 11–16 are shown in Table 3.

TABLE 3

Examples 11–16

| Example No. | MQ (%) | Retention | Tack |
|---|---|---|---|
| 11 | 66.9 | ok | slight |
| 12 | 68.3 | ok | ok |
| 13 | 69.6 | ok | ok |
| 14 | 70.8 | ok | ok |
| 15 | 71.5 | fail | ok |
| 16 | 73.9 | fail | ok |

EXAMPLES 17 AND 18

The procedures followed in Examples 7 and 8 were repeated in Examples 17 and 18 respectively. The compositions used in Examples 17 and 18 were the same as those used in Examples 7 and 8 except that the MDVDM fluids had a viscosity of 104,000 centipoise at 25° C. and a vinyl content of 0.002 mole %. Furthermore, the MQ resin in Examples 17 and 18 had a solids content of 60.8% and the MDHDM fluid had a hydride content of 0.2–0.3 mole %.

The data for Examples 17 and 18 are shown in Table 4.

TABLE 4

Examples 17 and 18

| Example Number | g initial Composition | g MQ Added | MQ (%) | Retention | Tack |
|---|---|---|---|---|---|
| 17 | 254 | — | 70.9 | ok | ok |
| 18 | 250 | 42.6 | 76.7 | fail | ok |

EXAMPLE 19

Example 15 was repeated except that 72.9% by weight MQ resin was present, and the coated bulb was dropped at a temperature exceeding 60° C. The bulb broke but did not shatter and stuck slightly to the concrete surface.

The tack for several of the examples was additionally measured on cured, unadhered coating at a thickness of 2 to 4 mil coated on 1 mil Mylar, using a Polyken Probe Tack Tester, manufactured by Testing Machines Incorporated, which was fitted with a 0.5 cm probe and operated at a 1 cm/sec. closure rate, a 1 sec. dwell time and a weight opposing the probe as indicated in Table 5 below. In Table 5, the term "H/Vi molar" refers to the molar ratio of silicon-bonded hydrogen atoms to vinyl radicals.

TABLE 5

Tack Measurements

| Example Number | Weight Opposing Probe (g) | Tack (g/cm²) | % MQ | H/Vi molar |
|---|---|---|---|---|
| 6 | 20 | 290 | 62.9 | 6.0 |
| 1 | 20 | 40 | 67.4 | 4.4 |
| 1 | 40 | 125 | 67.4 | 4.4 |
| 1 | 100 | 325 | 67.4 | 4.4 |
| 2 | 40 | 45 | 67.4 | 3.9 |
| 4 | 20 | — | 69.6 | 4.3 |
| 4 | 40 | 0 | 69.6 | 4.3 |
| 4 | 100 | 45 | 69.6 | 4.3 |
| 5 | 20 | — | 73.6 | 4.2 |
| 5 | 40 | 0 | 73.6 | 4.2 |
| 5 | 100 | 0 | 73.6 | 4.2 |
| 7 | 20 | 50 | 67.4 | 10.0 |
| 7 | 40 | 130 | 67.4 | 10.0 |
| 7 | 100 | 320 | 67.4 | 10.0 |
| 9 | 20 | — | 69.7 | 10.0 |
| 9 | 40 | 0 | 69.7 | 10.0 |
| 9 | 100 | 0 | 69.7 | 10.0 |
| 10 | 20 | 0 | 71.3 | 10.0 |
| 10 | 40 | 10 | 71.3 | 10.0 |
| 10 | 100 | 30 | 71.3 | 10.0 |

The data presented in Tables 1–5 indicate that lower levels of MQ resin in the bath render the coating tacky while higher levels of MQ resin render the coating too brittle. The data in the tables above indicate that the use of MQ resin levels within the scope of the present invention provides a coating which effectively prevents the shattering of the glass envelope of the light bulb.

That which is claimed is:

1. A transparent and fast curing composition suitable for use as a shatter-resistant coating on a glass, porcelain or ceramic surface, wherein the composition comprises:
   (A) from 62 to 71 parts by weight of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ unit, at least 95 percent of all radicals in (A) being methyl and the total number of R radicals in (A) that have olefinic unsaturation being 0–0.5 percent of all R radicals in (A),
   (B) from about 29 to about 38 parts by weight of an essentially cyclic free, polydiorganosiloxane of the average formula

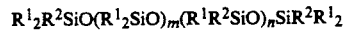

where each $R^1$ individually is a radical selected from the group consisting of methyl, ethyl, propyl, and phenyl, at least 95 percent of all $R^1$ radicals being methyl, each $R^2$ individually is a vinyl radical or any $R^1$ as defined above with the proviso that at least 2 $R^2$ radicals must be vinyl and m+n has an average value such that the viscosity of the polydiorganosiloxane (B) has a value of from about 500 to about 1,000,000 centipoises at 25° C., the total of (A) and (B) being 100 parts by weight;
   (C) an amount of an organopolysiloxane compatible with the mixture of (A) and (B) and having an average unit formula

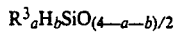

where each $R^3$ individually is any $R^1$ radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (C), no silicon atom bearing more than one silicon bonded hydrogen atom and the amount of (C) present being sufficient to provide from 1.0 to 30.0 silicon bonded hydrogen atoms for every olefinically unsaturated radical in the total of (A) plus (B) and, (D) a platinum-containing catalyst in sufficient quantity to provide at least 0.1 part by weight of platinum for every one million parts by weight of the combined weight of (A), (B), and (C).

2. A composition according to claim 1 wherein component A is present in an amount in the range of about 66 to about 71 parts by weight based on 100 parts of Components (A) and (B).

3. A composition according to claim 2 wherein component A is present in an amount in the range of about 69.5 to about 71 parts by weight based on 100 parts of Components (A) and (B).

4. A composition according to claim 1 wherein substantially all R radicals in component A are methyl.

5. A composition according to claim 1 wherein component B is a vinyldimethylorganosiloxy-terminated polydimethylsiloxane.

6. A composition according to claim 1 wherein the component C comprises a linear liquid polysiloxane which contains at least two methylhydrogensiloxy groups.

7. A composition according to claim 1 wherein component (C) is present in an amount sufficient to provide about 4 to about 10 silicon bonded hydrogen atoms for every olefinically unsaturated radical in the total of (A) plus (B).

8. A transparent and fast curing shatter-resistant composition comprising the cured reaction product of the composition of claim 1.

9. A glass, ceramic, or porcelain article of manufacture, comprising on its surface the cured composition of claim 1.

10. The article of claim 9 wherein the article is an incandescent electric lamp.

11. A transparent, fast curing, and substantially tack-free shatter-resistant composition comprising the cured reaction product of a composition comprising (A) from 66 to 71 parts by weight of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ unit, at least 95 percent of all radicals in (A) being methyl and the total number of R radicals in (A) that have olefinic unsaturation being 0–0.5 percent of all R radicals in (A), (B) where each $R^1$ individually is a radical (C) an amount of an organopolysiloxane compatible with the mixture of (A) and (B) and having an average unit formula

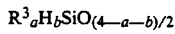

where each $R^3$ individually is any $R^1$ radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (C), no silicon atom bearing more than one silicon bonded hydrogen atom and the amount of (C) present being sufficient to provide from 1.0 to 30.0 silicon bonded hydrogen atoms for every olefinically unsaturated radical in the total of (A) plus (B) and, (D) a platinum-containing catalyst in sufficient quantity to provide at least 0.1 part by weight of platinum for every one million parts by weight of the combined weight of (A), (B), and (C).

12. A glass, ceramic, or porcelain article of manufacture, comprising on its surface the cured composition of claim 10.

13. The article of claim 11 wherein the article is an incandescent electric lamp.

* * * * *